(12) United States Patent
Matsuno et al.

(10) Patent No.: US 8,924,114 B2
(45) Date of Patent: Dec. 30, 2014

(54) CONTROL DEVICE FOR FOUR-WHEEL DRIVE VEHICLE

(71) Applicant: Fuji Jukogyo Kabushiki Kaisha, Tokyo (JP)

(72) Inventors: Koji Matsuno, Tokyo (JP); Shiro Ezoe, Tokyo (JP); Hajime Oyama, Tokyo (JP); Yuichirou Tamura, Tokyo (JP); Takeshi Terazawa, Tokyo (JP); Akihiro Watanabe, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/030,452

(22) Filed: Sep. 18, 2013

(65) Prior Publication Data

US 2014/0088833 A1  Mar. 27, 2014

(30) Foreign Application Priority Data

Sep. 21, 2012 (JP) ................................. 2012-208612

(51) Int. Cl.
| | |
|---|---|
| *B60K 17/34* | (2006.01) |
| *B62D 11/00* | (2006.01) |
| *B60K 17/348* | (2006.01) |
| *B60W 30/045* | (2012.01) |
| *B60W 10/119* | (2012.01) |

(52) U.S. Cl.
CPC ............ *B62D 11/003* (2013.01); *B60K 17/348* (2013.01); *B60W 30/045* (2013.01); *B60Y 2300/82* (2013.01); *B60W 10/119* (2013.01); *B60W 2520/14* (2013.01); *B60W 2520/20* (2013.01); *B60W 2520/28* (2013.01); *B60W 2720/14* (2013.01); *B60W 2720/406* (2013.01)

USPC ............................................................. 701/69

(58) Field of Classification Search
None
See application file for complete search history.

(56) References Cited

U.S. PATENT DOCUMENTS

| | | | | | |
|---|---|---|---|---|---|
| 4,874,059 | A | * | 10/1989 | Kasegawa | 180/249 |
| 5,168,955 | A | * | 12/1992 | Naito | 180/197 |
| 5,265,020 | A | * | 11/1993 | Nakayama | 701/36 |
| 5,315,519 | A | * | 5/1994 | Chin et al. | 701/72 |
| 5,365,443 | A | * | 11/1994 | Tsuyama et al. | 701/83 |
| 5,497,333 | A | * | 3/1996 | Sasaki | 701/72 |

(Continued)

FOREIGN PATENT DOCUMENTS

| | | |
|---|---|---|
| JP | 05-238281 A | 9/1993 |
| JP | 07-164911 A | 6/1995 |

(Continued)

*Primary Examiner* — John R Olszewski
*Assistant Examiner* — Navid Ziaeianmehdizadeh
(74) *Attorney, Agent, or Firm* — McDermott Will & Emery LLP (57) ABSTRACT

When there is a curve in a forward driving path of a vehicle, a wheel clutch for a turning outer wheel of a rear shaft is engaged and a wheel clutch for a turning inner wheel of the rear shaft is disengaged during driving of the curve. When there is no curve, both of the right and left wheel clutches are engaged when it is estimated the vehicle receive a predetermined disturbance input during forward driving. Then, a target yaw moment of a vehicle is calculated. If an average speed of the right and left wheels of a front shaft is more than the speed of the turning outer wheel, the wheel clutch for the turning outer wheel is engaged when the target yaw moment is applied to the vehicle, so that the engaging force of a transfer clutch is controlled based on the target yaw moment.

14 Claims, 4 Drawing Sheets

(56) References Cited

U.S. PATENT DOCUMENTS

| | | | |
|---|---|---|---|
| 5,631,829 A * | 5/1997 | Takasaki et al. | 701/69 |
| 5,685,386 A * | 11/1997 | Kondo et al. | 180/76 |
| 5,691,900 A * | 11/1997 | Luckevich | 701/41 |
| 5,740,877 A * | 4/1998 | Sasaki | 180/248 |
| 5,839,084 A * | 11/1998 | Takasaki et al. | 701/67 |
| 5,978,726 A * | 11/1999 | Takeda et al. | 701/84 |
| 6,145,614 A * | 11/2000 | Kimura et al. | 180/248 |
| 6,219,609 B1 * | 4/2001 | Matsuno et al. | 701/72 |
| 6,304,805 B1 * | 10/2001 | Onogi | 701/36 |
| 6,575,261 B2 * | 6/2003 | Mori et al. | 180/248 |
| 6,810,983 B2 * | 11/2004 | Matsuno | 180/249 |
| 7,258,185 B2 * | 8/2007 | Ohno et al. | 180/197 |
| 7,530,421 B2 * | 5/2009 | Mori et al. | 180/248 |
| 7,610,980 B2 * | 11/2009 | Mori | 180/233 |
| 7,676,314 B2 * | 3/2010 | Kato et al. | 701/72 |
| 7,933,707 B2 * | 4/2011 | Berger et al. | 701/67 |
| 8,265,845 B2 * | 9/2012 | Yamamura et al. | 701/69 |
| 8,285,450 B2 * | 10/2012 | Ushiroda et al. | 701/41 |
| 8,332,112 B2 * | 12/2012 | Handa et al. | 701/69 |
| 8,744,710 B2 * | 6/2014 | Hiroya | 701/69 |
| 2002/0055416 A1 * | 5/2002 | Sakakiyama | 477/174 |
| 2004/0026148 A1 * | 2/2004 | Matsuno | 180/248 |
| 2005/0121248 A1 * | 6/2005 | Ushiroda et al. | 180/248 |
| 2007/0029127 A1 * | 2/2007 | Mori et al. | 180/247 |
| 2013/0103278 A1 * | 4/2013 | Suzuki et al. | 701/70 |

FOREIGN PATENT DOCUMENTS

| | | |
|---|---|---|
| JP | 11-115554 A | 4/1999 |
| JP | 2000-280776 A | 10/2000 |
| JP | 2002-148356 A | 5/2002 |
| JP | 2009-177309 A | 8/2009 |

* cited by examiner

CONTROL DEVICE FOR FOUR-WHEEL DRIVE VEHICLE

CROSS-REFERENCE TO RELATED APPLICATIONS

The present application claims priority from Japanese Patent Application No. 2012-208612 filed on Sep. 21, 2012, the entire contents of which are hereby incorporated by reference.

BACKGROUND

1. Technical Field

The present invention relates to control devices for a four-wheel drive vehicle to appropriately distribute driving force generated by a driving source such as an engine based on forward information obtained by a camera system and a navigation system.

2. Related Art

Various kinds of control devices for four-wheel drive vehicles have been suggested and put into practice. and, for instance, Japanese Unexamined Patent Application Publication (JP-A) No. 2000-280776 discloses a control device for a four-wheel drive vehicle including a rear-wheel driving system in which rear wheels serves as driving wheels in a two-wheel drive mode as well as a four-wheel drive mode, a force transmission switching mechanism for disengaging or engaging a front-wheel driving system in which front wheels serves as non-driving wheels in the two-wheel drive mode, and a free running differential mechanism for engaging or disengaging the front-wheel driving system at a predetermined position. Neither of the mechanisms includes any synchronization device, but the controller includes a control unit to control both of the mechanisms as follows: in the four-wheel drive mode, the rear-wheel driving system and the front-wheel driving system are engaged and the front-wheel driving system is engaged at the predetermined position. In the two-wheel drive mode from when an ignition switch is turned on to when the four-wheel drive mode is first established, the rear-wheel driving system and the front-wheel driving system are disengaged and the front-wheel driving system is disengaged at the predetermined position. In the two-wheel drive mode from when four-wheel drive mode is once established to when the ignition switch is turned off, the rear-wheel driving system and the front-wheel driving system are disengaged and the front-wheel driving system is engaged at the predetermined position.

In a typical four-wheel drive vehicle, when unnecessary rotation of a drive shaft is stopped during the two-wheel drive mode in order to reduce driving resistance, rotation synchronization is required for switching the two-wheel drive mode to the four-wheel drive mode. The control device for a four-wheel drive vehicle disclosed in JP-A No. 2000-080776 described above address this problem upon switching between the two-wheel drive mode and the four-wheel drive mode. However, with this controller, it is impossible to stop unnecessary rotation of the drive shaft even when the four-wheel drive mode is once returned back to the two-wheel drive mode in order to reduce the driving resistance during driving, and the effect of reducing the driving resistance is impaired. Even when some rotation synchronization function is used, it takes a considerable time to perform switching to the four-wheel drive mode, the differential lock thereof, or the driving force distribution control, which may cause a delay in operation.

SUMMARY OF THE INVENTION

The present invention is made in view of the above circumstances, and it is an object of the present invention to provide a control device for a four-wheel drive vehicle capable of achieving the highest degree of effect of reducing the driving resistance, preventing reduction in control due to a delay in switching of a driving force distribution mechanism, and capable of stabilizing vehicle behaviors under disturbance without uncomfortable shock and a delay in operation during rotation synchronization of driving systems.

An aspect of the present invention provides a control device for a four-wheel drive vehicle including: a driving force distributor; clutches; a forward driving state estimator; a clutch controller; a driving force distribution controller. The driving force distributor is provided between a main drive shaft, which is either one of a front shaft and a rear shaft, and a sub-drive shaft, which is the other one of a front shaft and a rear shaft, and variably changes driving force distribution between a main drive shaft and the sub-drive shaft. The clutches are provided for the sub-drive shaft, and engage and disengage transmission of driving force to each of a left wheel and a right wheel, instead of a differential mechanism between the right and left wheels. The forward driving state estimator estimates a forward driving state of a vehicle by recognizing a forward driving path of the vehicle. A clutch controller controls the engagement and disengagement of the right and left clutches of the sub-drive shaft based on at least the forward driving state of the vehicle estimated by the forward driving state estimator. The driving force distribution controller calculates, as a target yaw moment, a yaw moment which is applied to the vehicle based on an operation state of the vehicle, and controls the driving force distributor based on the target yaw moment.

BRIEF DESCRIPTION OF THE DRAWINGS

FIGS. 4A to 4C are explanatory diagrams showing activation of each clutch according to the embodiment of the present invention.

DETAILED DESCRIPTION

Hereinafter, an example of the present invention will be described with reference to the drawings.

Figure 1:
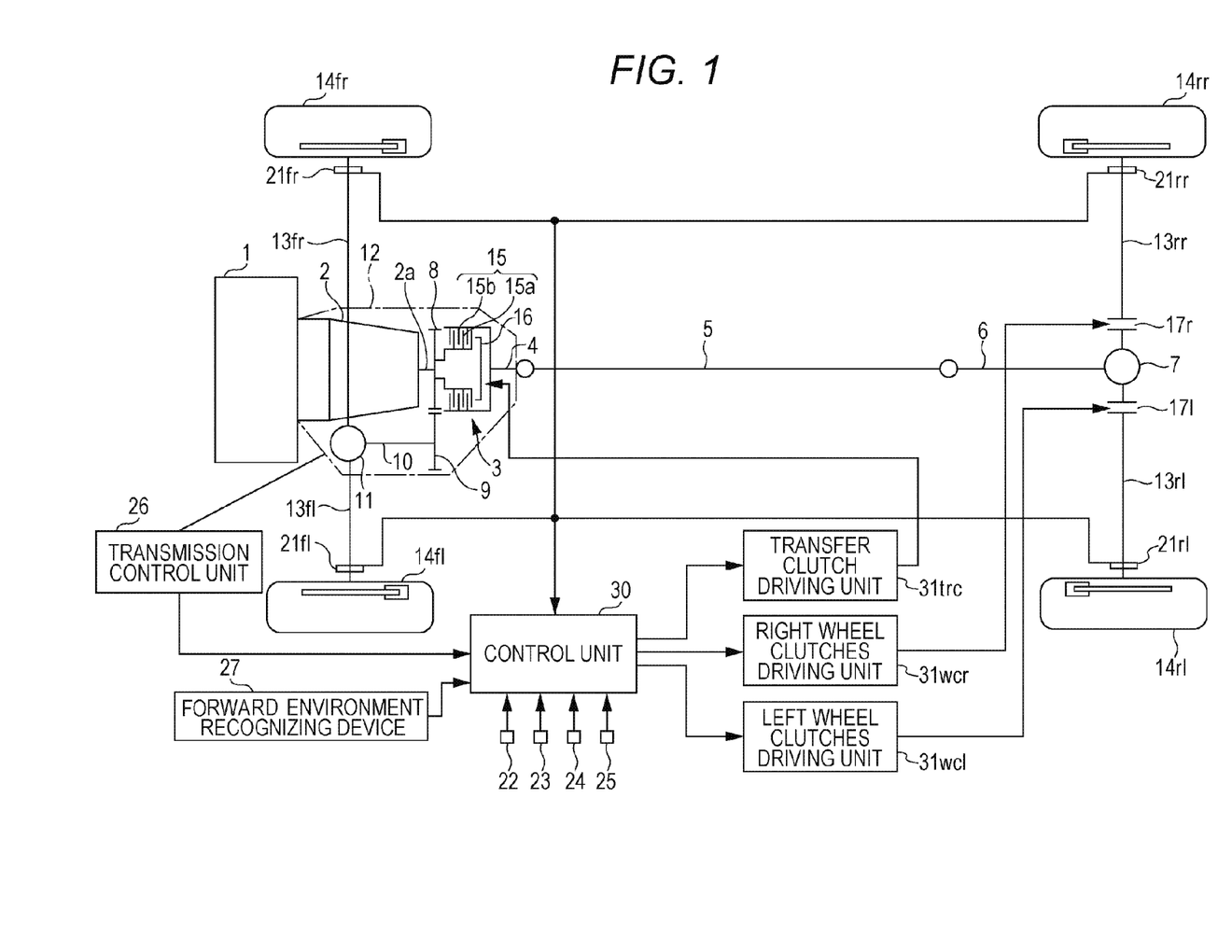
FIG. 1 is an explanatory diagram showing a schematic configuration of a vehicle according to an example of the present invention.

In FIG. 1, reference numeral 1 denotes an engine provided at a front portion of a vehicle. The driving force of the engine 1 is transmitted from an automatic transmission device (including a torque converter and the like) 2 at the rear of the engine 1 to a transfer 3 by way of a transmission output shaft 2a.

Further, the driving force transmitted to the transfer 3 is given to a rear wheel final reduction gear 7 by way of a rear driving axle 4, a propeller shaft 5, and a drive pinion shaft unit 6 as well as to a front wheel final reduction gear 11 by way of a reduction drive gear 8, a reduction drive gear 9, and a front driving shaft 10 which is a drive pinion shaft unit. The automatic transmission device 2, the transfer 3, the front wheel final reduction gear 11, and the like are housed integrally within a case 12.

The driving force given to the rear wheel final reduction gear 7 is transmitted to a left rear wheel 14rl by way of a rear wheel left driving shaft 13rl and further to a right rear wheel 14rr by way of a rear wheel right driving shaft 13rr.

The driving force given to the front wheel final reduction gear 11 is transmitted to a left front wheel 14fl by way of a front wheel left driving shaft 13fl and to a right front wheel 14fr by way of a front wheel right driving shaft 13fr.

The transfer 3 includes a multi-plate wet clutch (transfer clutch) 15 and a driven plate 15b. The transfer 3, which serves as a driving force distribution unit, is a variable torque transmission capacity-type clutch constituted by alternately laying a drive plate 15a provided at the reduction drive gear 8 and a driven plate 15b provided at the rear driving shaft 4. The transfer piston 16 gives the engaging force of the transfer clutch 15 (rear shaft driving torque) in a variable manner. Therefore, this vehicle is a four-wheel drive vehicle having a front-engine, front-wheel drive layout (FF), and capable of changing the torque distribution ratio of the front wheel (main drive shaft) and the rear wheels (sub-drive shaft) in a range, e.g., 100:0 to 50:50, by controlling pressing force with the transfer piston 16 and controlling the engaging force of the transfer clutch 15.

The pressing force of the transfer piston 16 is given by a transfer clutch driving unit 31trc constituted by a hydraulic circuit having multiple solenoid valves and the like. A control signal (transfer clutch engaging force Pt) for driving the transfer clutch driving unit 31trc is output from a later-described control unit 30.

The rear wheel final reduction gear 7 does not have a differential mechanism. Instead, a left wheel clutch 17l serving as the clutch that can freely engage and disengage transmission of the driving force is interposed in the rear wheel left drive shaft 13rl, while a right wheel clutch 17r serving as the clutch that can freely engage and disengage transmission of the driving force is interposed in the rear wheel right drive shaft 13rr. When the right and left wheel clutches 17l and 17r engage and disengage the drive shafts 13rl and 13rr respectively, they execute engaging and disengaging in synchronization with the rotation speed, which is publicly known. The right and left wheel clutches 17l and 17r are activated by right and left wheel clutch driving units 31wcl and 31wcr constituted by hydraulic circuits having multiple solenoid valves and the like. Control signals for driving the right and left wheel clutches driving units 31wcl and 31wcr are output from the later-described control unit 30.

Next, the details of the control unit 30 will be described.

The control unit 30 is connected to wheel speed sensors of the wheels 14fl, 14fr, 14rl and 14rr (a left front wheel speed sensor 21fl, a right front wheel speed sensor 21fr, a left rear wheel speed sensor 21rl, and a right rear wheel speed sensor 21rr), a steering wheel angle sensor 22, a yaw rate sensor 23, an engine rotation speed sensor 24, an intake air amount sensor 25, and a transmission control unit 26 that performs gear change control and the like of the automatic transmission device 2. The control unit 30 receives, as the driving state of the vehicle, signals of speeds of the wheels (a left front wheel speed $\omega$fl, a right front wheel speed $\omega$fr, a left rear wheel speed $\omega$rl, and a right rear wheel speed $\omega$rr), a steering wheel angle $\theta$H, a yaw rate $\gamma$, an engine rotation speed $\omega$EG, an intake air amount mair, and a transmission gear ratio GTM.

The control unit 30 is connected to a forward environment recognizing device 27 that serving as the forward driving state estimator, and detects and inputs to the control unit 30 information on a forward driving state that may cause disturbance to the vehicle during driving, such as curve information on a forward driving path of the vehicle, whether the forward driving path is an expressway, driving at a tunnel exit, passing a bridge, driving side by side with a truck, a steep ascending/descending slope in front, an uneven lane line, a rough road surface, existence of a puddle, and the like.

The forward environment recognizing device 27 includes a known navigation system and a stereo camera system (which are not shown).

Curve information on the forward driving path of the vehicle, road type of the forward driving path, driving at a tunnel exit driving, passing a bridge, a steep ascending/descending slope in front are detected based on guided route information on a map that is set by the navigation system and map information obtained based on the navigation system.

The stereo camera system has, for instance, a pair of cameras (right and left cameras) using solid state image sensors, and the cameras are attached with a certain base length therebetween at the front portion of a ceiling of a vehicle compartment. The stereo camera system captures stereo images of a target outside of the vehicle from different viewpoints. The stereo camera system includes an image processing engine that processes images captured by the cameras at a high speed, and performs recognizing processing based on an output result of the image processing engine and driving information on the vehicle (driving information such as vehicle speed V).

For instance, the image processing in the stereo camera system is performed as follows:

First, the stereo camera system obtains distance information from a deviation amount of corresponding positions in a pair of stereo images of the forward of the vehicle in the driving direction, captured by the cameras, and generates a distance image. Then, a known grouping process is performed based upon the data. Specifically, the data is compared with frames (windows) of three-dimensional road shape data, side wall data, three-dimensional object data and the like which are stored in advance. With this process, lane line data, and side wall data such as a guard rail or a curb existing along the road are extracted, and the three-dimensional objects are extracted classifying the three-dimensional objects into types such as vehicles (large vehicles such as trucks, and other ordinary vehicles), pedestrians, and other three-dimensional objects.

These pieces of data are calculated as data on a coordinate system in which the vehicle is defined as an origin, the longitudinal direction of the vehicle is defined as a Z axis, and the widthwise direction thereof is defined as an X axis. The lane line data, the sidewall data such as the guard rail or the curb existing along the road, the type of the three-dimensional object, the distance between the vehicle and the three-dimensional object, the speed (time differential value of the distance+vehicle speed V), acceleration (time differential value of speed), central position, both end positions and the like are extracted as three-dimensional object information. In particular, with respect to the road shape, for example, a curve (or a straight line) continuing in a central portion between a left lane line and a right lane line is estimated as the forward driving path of the vehicle. The shape of the forward driving path of the vehicle (curve information on the forward driving path) obtained based on the navigation system can also be obtained by deriving the shape of the forward driving path of the vehicle.

As disclosed in, for instance, JP-A No. 2002-148356, an application previously filed by the applicant of the present application, an uneven lane line, a rough road surface, a puddle and the like are detected based on, e.g., the edge intensity of the screen (luminance differential value), lane reliability, and luminance ratio between the lane line and the road surface. Further, driving at a tunnel exit can be estimated by using a method as disclosed in, for instance, JP-A No. 2009-177309, an application filed by the applicant of the present application. In the example, the shape of the forward driving path of the vehicle is recognized based on image information given by the pair of cameras. Alternatively, it is to be understood that the example can also be applied to a vehicle driving support device that performs recognition based on image information given by a single lens camera or a color camera, and such camera may be used in combination with other recognition sensors such as millimeter-wave radar or inter-vehicle communication.

When there is a curve in the forward driving path, the control unit 30 engages the wheel clutch for the turning outer wheel during driving on the curve, and disengages the wheel clutch for the turning inner wheel. On the other hand, when there is no curve on the forward driving path, the control unit 30 engages both of the right and left wheel clutches 17*l* and 17*r* when it is estimated that the vehicle receives a predetermined disturbance input during forward driving. The control unit 30 calculates yaw moment for suppressing understeer tendency of the vehicle as a target yaw moment Mzt. If the average wheel speed of the right and left wheels of the front shaft $((\omega fl+\omega fr)/2)$ is more than the wheel speed of a turning outer wheel of the rear shaft, the control unit 30 performs control as follows: when the target yaw moment Mzt is applied to the vehicle, the wheel clutch of rear shaft for the turning outer wheel is engaged, so that the engaging force of the transfer clutch 15 is controlled based on the target yaw moment Mzt.

Figure 2:
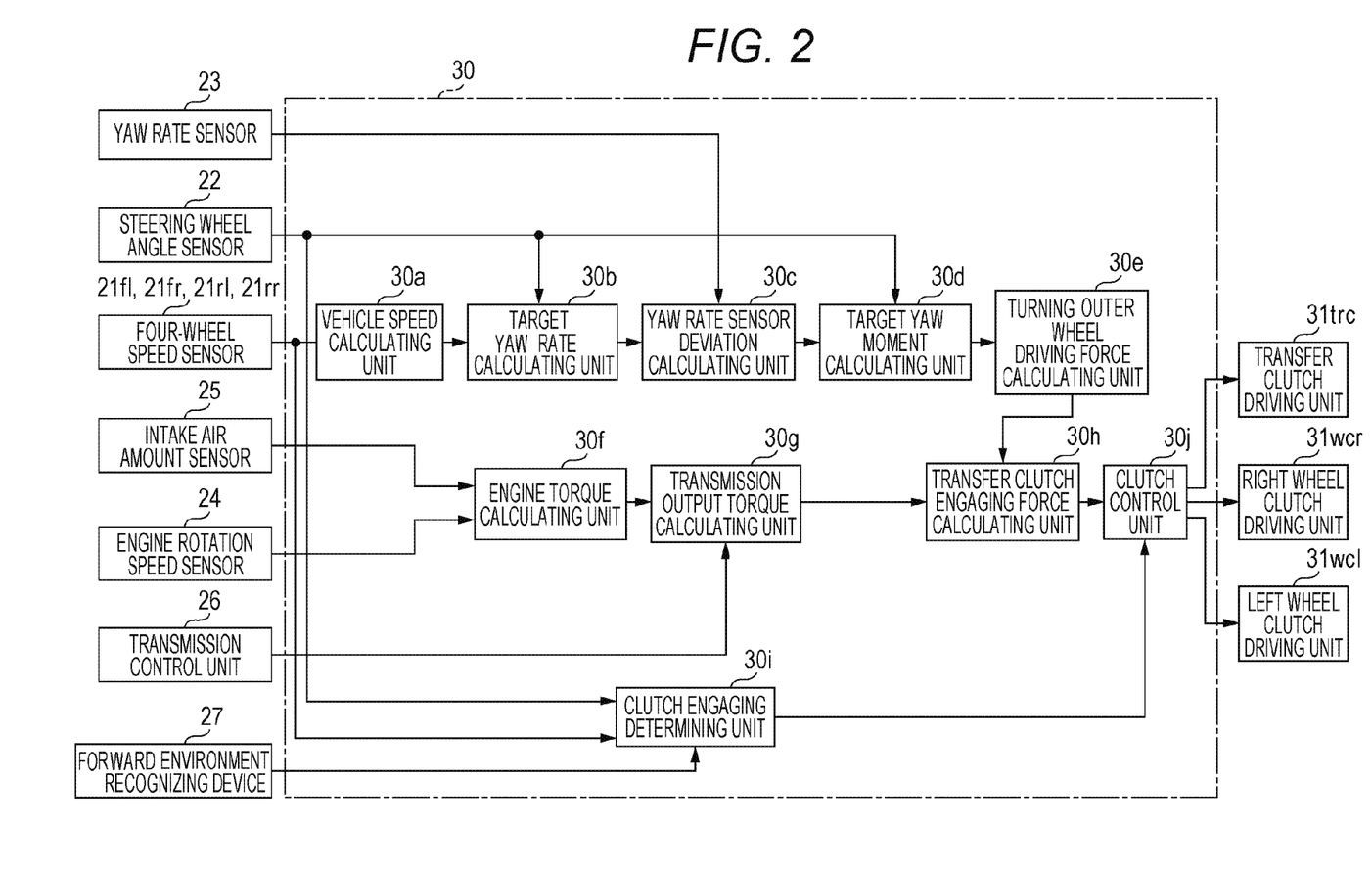
FIG. 2 is a functional block diagram showing a control unit according to the example of the present invention.

Accordingly, as illustrated in FIG. 2, the control unit 30 mainly includes a vehicle speed calculating unit 30*a*, a target yaw rate calculating unit 30*b*, a yaw rate deviation calculating unit 30*c*, a target yaw moment calculating unit 30*d*, a turning outer wheel driving force calculating unit 30*e*, an engine torque calculating unit 30*f*, a transmission output torque calculating unit 30*g*, a transfer clutch engaging force calculating unit 30*h*, a clutch engaging determining unit 30*i*, and a clutch control unit 30*j*.

The vehicle speed calculating unit 30*a* receives the wheel speeds $\omega fl$, $\omega fr$, $\omega rl$ and $\omega rr$ respectively from the wheel speed sensors 21*fl*, 21*fr*, 21*rl* and 21*rr*. Then, the vehicle speed V is calculated by, for instance, calculating the average of the wheel speeds $\omega fl$, $\omega fr$, $\omega rl$ and $\omega rr$, and it is output to the target yaw rate calculating unit 30*b*.

The target yaw rate calculating unit 30*b* receives the steering wheel angle $\theta H$ from the steering wheel angle sensor 22, and receives the $\Delta$vehicle speed V from the vehicle speed calculating unit 30*a*. Then, the target yaw rate $\gamma t$ is calculated according to, for instance, the following expression (1), and it is output to the yaw rate deviation calculating unit 30*c*.

$$\gamma t=(1/(1+A\cdot V2))\cdot(V/l)\cdot(\theta H/n) \quad (1)$$

Where, A is a stability factor, l is a wheel base, and n is a steering gear ratio.

The yaw rate deviation calculating unit 30*c* receives the yaw rate $\gamma$ from the yaw rate sensor 23, and receives the target yaw rate $\gamma t$ from the target yaw rate calculating unit 30*b*. Then, the yaw rate deviation $\Delta\gamma$ is calculated according to the following expression (2), and it is output to the target yaw moment calculating unit 30*d*.

$$\Delta\gamma=\gamma-\gamma t \quad (2)$$

The target yaw moment calculating unit 30*d* receives the steering wheel angle $\theta H$ from the steering wheel angle sensor 22, and receives the yaw rate deviation $\Delta\gamma$ from the yaw rate deviation calculating unit 30*c*. Then, the target yaw moment Mzt is set according to for instance, the following expression (3) or (4), and it is output to the turning outer wheel driving force calculating unit 30*e*.

If $|\Delta\gamma|>e$ holds and the yaw rate deviation $\Delta\gamma$ and the steering wheel angle $\theta H$ are of different signs:

$$Mzt=GMZ\cdot\Delta\gamma \quad (3)$$

Other cases:

$$Mzt=0 \quad (4)$$

Where, e denotes an activation threshold value which is set by experiment, calculation, and the like in advance, and GMZ denotes a yaw moment gain which is set by experiment, calculation, and the like in advance. More specifically, when a difference between target vehicle behavior and actual vehicle behavior is large ($|\Delta\gamma|>e$) and the vehicle behavior has understeer tendency (the yaw rate sensor deviation $\Delta\gamma$ and the steering wheel angle $\theta H$ are of different signs), then the target yaw moment Mzt given to the vehicle is calculated according to the above expression (3). In the other cases, the target yaw moment Mzt given to the vehicle is zero. As described above, in the example, a target yaw moment calculating unit is constituted by the vehicle speed calculating unit 30*a*, the target yaw rate calculating unit 30*b*, the yaw rate deviation calculating unit 30*c*, and the target yaw moment calculating unit 30*d*.

The turning outer wheel driving force calculating unit 30*e* receives the target yaw moment Mzt from the target yaw moment calculating unit 30*d*. Then, a turning curve outside wheel driving force Fd is calculated according to, for instance, the following expression (5), and it is output to the transfer clutch engaging force calculating unit 30*h*.

$$Fd=2\cdot|Mzt|/w \quad (5)$$

Where, w denotes a rear shaft wheel tread.

The engine torque calculating unit 30*f* receives the engine rotation speed $\omega EG$ from the engine rotation speed sensor 24, and receives the intake air amount mair from the intake air amount sensor 25. Then, the engine torque TEG is set by, for instance, looking up a map (engine characteristics map) that is set in advance, and is output to the transmission output torque calculating unit 30*g*.

The transmission output torque calculating unit 30*g* receives the transmission gear ratio GTM from the transmission control unit 26, and receives the engine torque TEG from the engine torque calculating unit 30*f*. Then, the transmission output torque TTM is calculated by, for instance, the following expression (6), and it is output to the transfer clutch engaging force calculating unit 30*h*.

$$TTM=TEG\cdot GTM \quad (6)$$

The transfer clutch engaging force calculating unit 30*h* receives turning outer wheel driving force Fd from turning outer wheel driving force calculating unit 30*e*, and receives the transmission output torque TTM from the transmission output torque calculating unit 30*g*. Then, the transfer clutch engaging force Pt is calculated according to, for instance, the following expression (7), and it is output to the clutch control unit 30*j*.

$$Pt=min((Fd\cdot Rt/GFr),TTM)\cdot Ct \quad (7)$$

Where, Rt denotes a tire radius, GFr denotes a final reduction ratio of the rear shaft, and min ((Fd·Rt/GFr), TTM) denotes the smaller one of (Fd·Rt/GFr) and TTM. In other words, the transfer clutch engaging force Pt is controlled so as to be athe transfer torque (Fd·Rt/GFr) in accordance with an understeer reduction request, while the transmission output torque TTM is adopted as the upper limit. Ct is a constant determined based on the clutch specification.

The clutch engaging determining unit 30$i$ receives the wheel speeds ωfl, ωfr, ωrl and ωrr respectively from the wheel speed sensors 21$fl$, 21$fr$, 21$rl$ and 21$rr$, and receives the steering wheel angle θH from the steering wheel angle sensor 22. The clutch engaging determining unit 30$i$ receives, from the forward environment recognizing device 27, information on a forward driving state that may cause disturbance to the vehicle driving, such as curve information on the forward driving path, whether the forward driving path is an expressway, driving at a tunnel exit, passing a bridge, driving side by side with a truck, a steep ascending/descending slope in front, an uneven lane line, a rough road surface, existence of a puddle, and the like. When there is a curve in the forward driving path, the clutch engaging determining unit 30$i$ determines the engagement of the wheel clutch for the turning outer wheel during driving of the curve, and disengage the wheel clutch for the turning inner wheel. When there is no curve in the forward driving path, the clutch engaging determining unit 30$i$ determines to engage both of the right and left wheel clutches 17$l$ and 17$r$ at the timing when it is estimated that the vehicle receives a predetermined disturbance input during forward driving. Further, the clutch engaging determining unit 30$i$ determines whether or not the condition of the following expression (8) (average wheel speed of the right and left wheels of the main drive shaft≥wheel speed of the turning outer wheel of the sub-drive shaft wheel) is satisfied or not. When the condition of the expression (8) is satisfied, the clutch engaging determining unit 30$i$ determines that the front wheel tends to slip, and determines to engage the wheel clutch for turning outer wheel, and outputs the determination result to the clutch control unit 30$j$.

$$(\omega fl+\omega fr)/2 \geq \omega out \tag{8}$$

Where, ωout denotes a wheel speed of the rear shaft for the turning outer wheel.

The clutch control unit 30$j$ receives the transfer clutch engaging force Pt from the transfer clutch engaging force calculating unit 30$h$, and receives the determination result of engagement/disengagement of the right and left wheel clutches 17$l$ and 17$r$ from the clutch engaging determining unit 30$i$. Then, based on the determination result of engagement/disengagement of the right and left wheel clutches 17$l$ and 17$r$, The clutch control unit 30$j$ outputs to the right and left wheel clutches driving units 31$wcl$ and 31$wcr$. The clutch control unit 30$j$ also outputs the transfer clutch engaging force Pt to the transfer clutch driving unit 31$trc$, with which the transfer clutch 15 is engaged. As described above, the clutch control unit 30$j$ is has the functions of the clutch controller and the driving force distribution controller.

Figure 3:
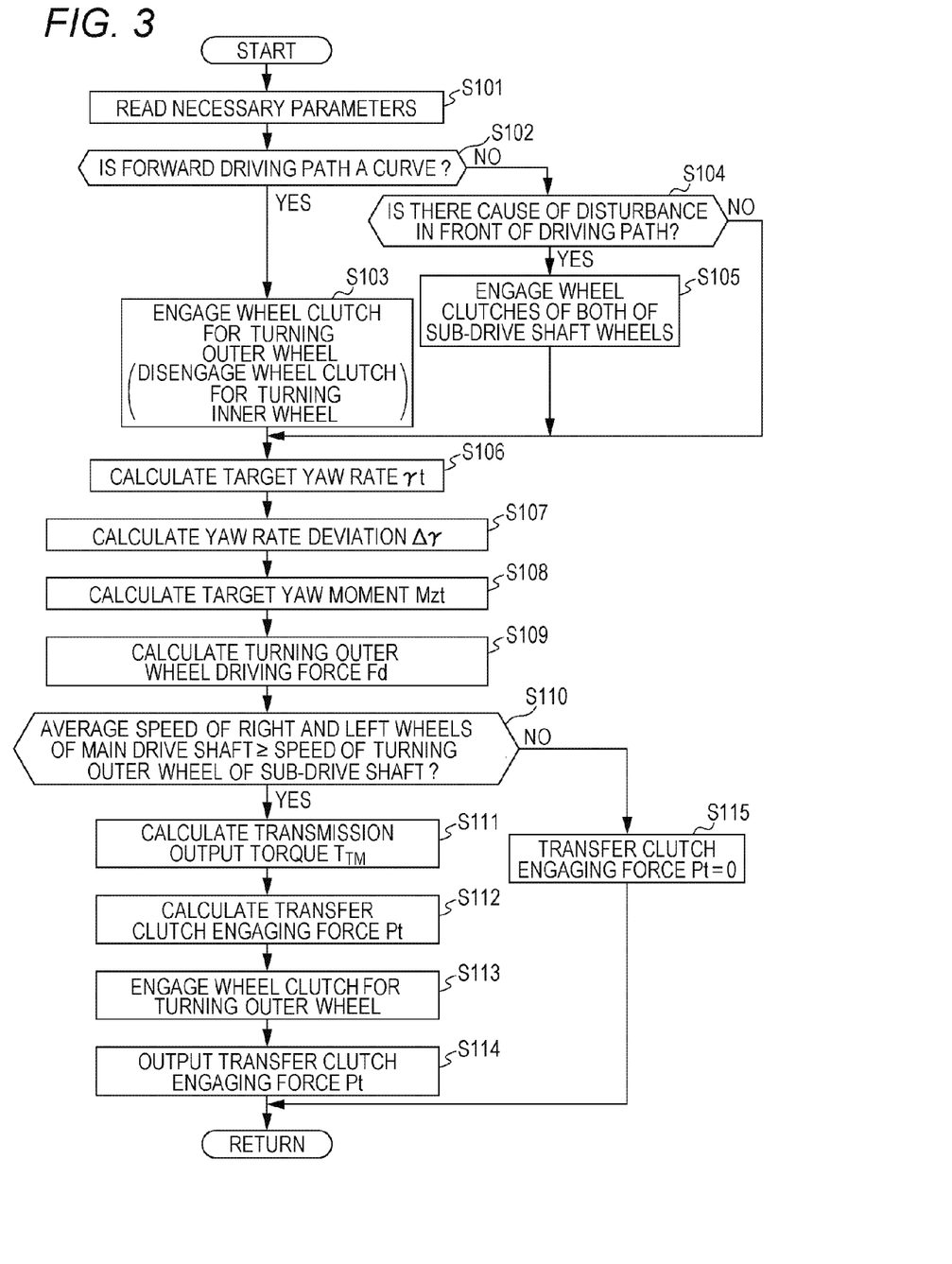
FIG. 3 is a flowchart showing a four-wheel driving control according to the example of the present invention.

The four-wheel driving control executed by the control unit 30 configured as described above will be described with reference to a flowchart of FIG. 3.

First, in step (hereinafter abbreviated as "S") S101, required parameters are read. Specifically, the signals of the four-wheel speeds ωfl, ωfr, ωrl and ωrr, the steering wheel angle θH, the yaw rate γ, the engine rotation speed ωEG, the intake air amount mair, the transmission gear ratio GTM, and the like are read. In addition, information on the forward driving state that may cause disturbance to the vehicle during driving, such as curve information on the forward driving path, whether the forward driving path is an expressway, driving at a tunnel exit, passing a bridge, driving side by side with a truck, a steep ascending/descending slope in front, uneven lane line, a rough road surface, existence of a puddle, and the like, are read.

In following S102, and the clutch engaging determining unit 30$i$ determines whether the forward driving path is a curve or not. If the clutch engaging determining unit 30$i$ determines that there is a curve, the process proceeds to S103, where the clutch control unit 30$j$ is caused to perform control so as to engage the wheel clutch for the turning outer wheel (disengage the turning inner wheel). Then, the process proceeds to S106.

If the clutch engaging determining unit 30$i$ determines that there is no curve a in S102, the process proceeds to S104, where the clutch engaging determining unit 30$i$ determines whether or not there is any cause of disturbance in the forward driving path (whether forward driving path is an expressway, driving at a tunnel exit, passing a bridge, driving side by side with a truck, a steep ascending/descending slope in front, an uneven white line, a rough road surface, existence of a puddle, and the like). If the clutch engaging determining unit 30$i$ determines that there is a cause of disturbance, the process proceeds to S105, where the clutch control unit 30$j$ is caused to perform control so as to engage both of the right and left wheel clutches 17$l$ and 17$r$ of the rear shaft, i.e., the sub-drive shaft. Then, the process proceeds to S106.

If the clutch engaging determining unit 30$i$ determines that there is no cause of disturbance in S104, the process proceeds to S106 without the above processing.

When the process proceeds to S106 from S103, S105, or S104 described above, the target yaw rate calculating unit 30$b$ calculates the target yaw rate γt, using the above expression (1).

In following S107, where the yaw rate deviation calculating unit 30$c$ calculates the yaw rate sensor deviation Δγ, using the above expression (2).

In following S108, the target yaw moment calculating unit 30$d$ sets the target yaw moment Mzt, using the expression 83) or (4) described above.

In following S109, the turning outer wheel driving force calculating unit 30$e$ calculates turning outer wheel driving force Fd, using the expression (5) described above.

In following S110, the clutch engaging determining unit 30$i$ determines whether or not the above expression (8), i.e., (ωfl+ωfr)/2 ωout (average wheel speed of the right and left wheels of main drive shaft≥wheel speed of the turning outer wheel of the sub-drive shaft) is satisfied. If the above expression (8) is satisfied, i.e., the front wheels tend to slip, the process proceeds to S111, where the transmission output torque calculating unit 30$g$ calculates the transmission output torque TTM using the expression (6) described above. Then in following S112 is, the transfer clutch engaging force calculating unit 30$h$ calculates the transfer clutch engaging force Pt, using the expression (7) described above.

In following S113, the clutch control unit 30$j$ outputs a signal to the driving unit of either one of the right and left wheel clutches driving units 31$wcl$ and 31$wcr$, whichever is the outer wheel, e to engage the wheel clutch of the turning outer wheel.

In following S114, the clutch control unit 30$j$ outputs the transfer clutch engaging force Pt to the transfer clutch driving unit 31$trc$ to engage the transfer clutch 15 with the transfer clutch engaging force Pt, and driving torque corresponding to the transfer clutch engaging force Pt is transmitted from the front shaft to the turning outer wheel of the rear shaft via the wheel clutch for the turning outer wheel, and the yaw moment preventing understeer tendency of the vehicle is applied to the vehicle.

If the above expression (8) is not satisfied in S110 described above, the process proceeds to S115, where the clutch control unit 30j sets the transfer clutch engaging force Pt to zero. Then process exits the routine.

Figure 4A:
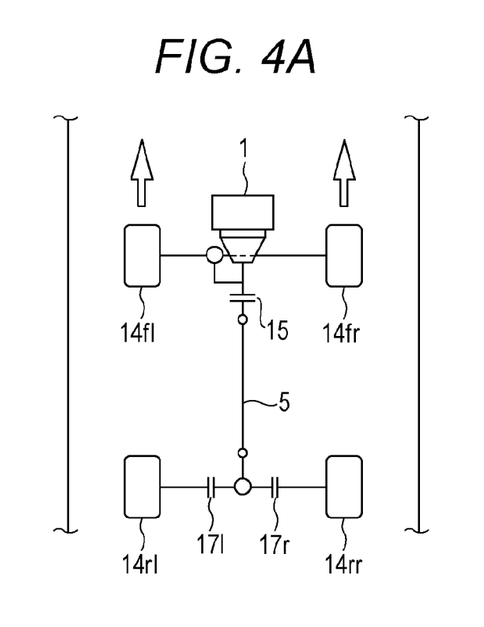
FIG. 4A is illustrates all clutch disengaged state.

Specifically, as illustrated in FIG. 4A, in a case where the average wheel speed of the right and left wheels of the front shaft is not more than the wheel speed of the turning outer wheel of the rear shaft (NO in S110) when there is no curve in the forward driving path and it is estimated that the vehicle receives no predetermined disturbance input during forward driving, all the clutches (transfer clutch 15, right and left wheel clutches 17l and 17r) are disengaged, and the driving resistance is reduced even without rotating the propeller shaft 5, whereby the driving force can be used with a high degree of efficiency.

When there is a curve in the forward driving path, the wheel clutch for the turning outer wheel during driving along the curve is engaged, and the wheel clutch for the turning inner wheel is disengaged. On the other hand, when there is no curve in the forward driving path, and it is estimated the vehicle receives a predetermined disturbance input during forward driving, then both of the right and left wheel clutches 17l and 17r are engaged, whereby it is possible to effectively prevent uncomfortable shock due to the operation of the transfer clutch driving unit 31trc, the right and left wheel clutches driving units 31wcl and 31wcr, the transfer clutch 15, and the right and left wheel clutches 17l and 17r in during rotation synchronization of the driving systems, as well as a delay in the operation of these devices.

Figure 4B:
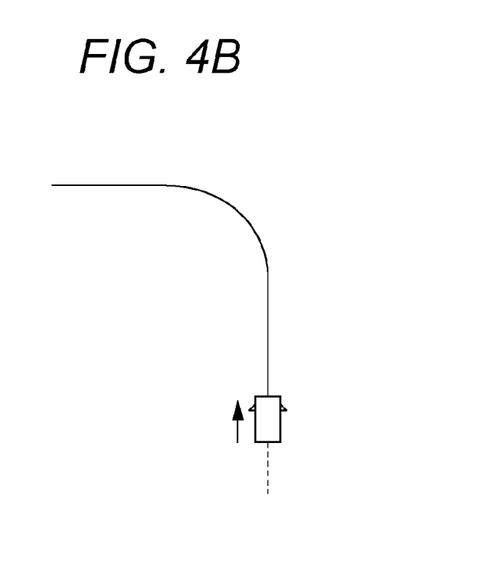
FIG. 4B illustrates the clutches when a forward driving path of the vehicle is a left curve.
Figure 4C:
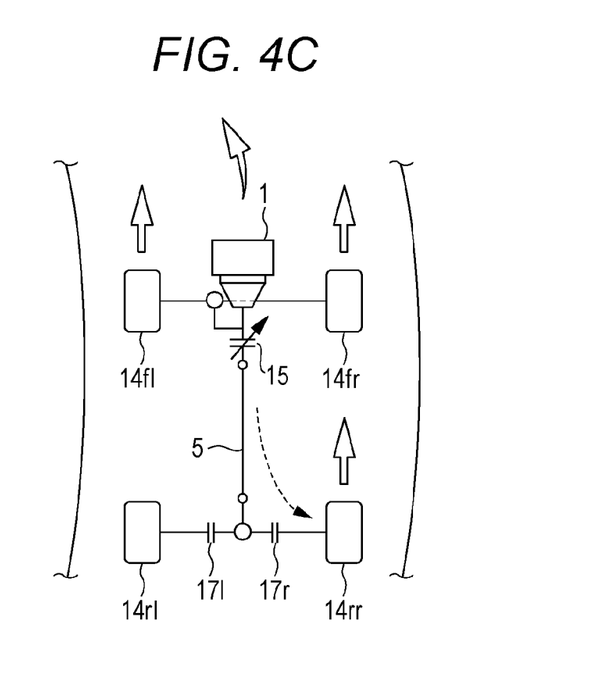
FIG. 4C illustrates a clutch control state when yaw moment is given to the vehicle.

More specifically, when there is a left curve in the forward driving path as illustrated in FIG. 4B, the wheel clutch 17r for the right rear-wheel 14rr, which is the turning outer wheel upon driving along the left curve, is engaged and the wheel clutch 17l for the turning inner wheel curve (left rear-wheel 14rl) is disengaged as illustrated in FIG. 4C, and the engaging force of the transfer clutch 15 between the front and rear shafts is controlled based on the target yaw moment Mzt, whereby the driving torque required to prevent understeer tendency of the vehicle is appropriately transmitted from the front wheels to the right rear-wheel 14rr. As a result, uncomfortable shock due to the operation of the wheel clutch 17r for the left rear-wheel 14rr and a delay in the operation of these devices are effectively prevented so that the understeer tendency of the vehicle is reliably prevented.

Though not shown, when it is estimated that the vehicle receives a predetermined disturbance input during forward driving, both of the right and left wheel clutches 17l and 17r are engaged, whereby the driving force distributed to the rear shaft due to the engagement of the transfer clutch 15 is appropriately transmitted to the rear wheels without causing uncomfortable shock due to the operation of the right and left wheel clutches 17l and 17r and without causing a delay in the operation thereof, whereby the stability of the vehicle behavior is maintained in a preferable manner.

As described above, according to the example of the present invention, if there is a curve in the forward driving path, the wheel clutch for the turning inner wheel during driving along the curve is engaged, and the wheel clutch for the turning inner wheel is disengaged. On the other hand, if there is no curve in the forward driving path, both of the right and left wheel clutches 17l and 17r are engaged when it is estimated that the vehicle receives a predetermined disturbance input during forward driving. Then, the yaw moment for suppressing understeer tendency of the vehicle is calculated as the target yaw moment Mzt. If the average wheel speed of the right and left wheels of the front shaft $((\omega fl+\omega fr)/2)$ is more than the wheel speed of the turning outer wheel of the rear shaft, the wheel clutch for the turning outer wheel of rear shaft is engaged upon applying the target yaw moment Mzt to the vehicle, so that the engaging force of the transfer clutch 15 is controlled based on the target yaw moment Mzt. Therefore, the highest degree of effect of reducing the driving resistance can be achieved, reduction in control due to a delay in switching of the driving force distributor can be prevented, and vehicle behavior can be stabilized under a disturbance without uncomfortable shock and delay in the operation during rotation synchronization of the driving system. Even in the case of a four-wheel drive vehicle which has clutch elements provided separately for both of the right and left wheels, the clutch elements of the right and left wheels may be constituted by the wheel clutches 17l and 17r and only engaging/opening thereof has to be controlled. Therefore, appropriate yaw moment can be applied to the vehicle by controlling the transfer clutch 15 and suppressing slipping of the main driving wheels while preventing right and left difference and drift due to mechanical difference between the clutch elements. Further, the engaging force Pt of the transfer clutch 15 is controlled at the transfer torque in accordance with an understeer reduction request, while the transmission output torque TTM is adopted as the upper limit. This can suppress slipping of the main driving wheels while preventing internal circulation torque of the driving system due to excessive engaging force of the transfer clutch 15.

In the above example of the present invention, the main drive shaft is the front shaft of the vehicle, and the sub-drive shaft is the rear shaft of the vehicle. However, the present invention can also be applied even to a vehicle in which the main drive shaft is the rear shaft of the vehicle, and the sub-drive shaft is the front shaft of the vehicle.

In the description about the example of the present invention, for example, the vehicle has the transfer clutch 15 which distributes the driving force between the front and rear shafts. However, the present invention can also be applied even to a vehicle in which the driving force of the front shaft and the driving force of the rear shaft are configured to be driven by different driving sources, and the driving force is distributed by controlling the driving sources. For instance, a vehicle may have the front shaft driven with the driving force provided by an engine and the rear shaft driven with the force provided by an electric motor.

Further, in the example of the present invention, for the calculation of the target yaw moment Mzt, the target yaw rate γt is employed as the target parameter of the vehicle behavior, and the yaw rate γ detected as the actual parameter of the vehicle behavior is employed. Alternatively, a target lateral acceleration may be employed as the target parameter of the vehicle behavior, and lateral acceleration detected as the actual parameter of the vehicle behavior may be employed.

The invention claimed is:

1. A control device for a four-wheel drive vehicle comprising:
 a driving force distributor provided between a main drive shaft, which is either one of a front shaft and a rear shaft, and a sub-drive shaft, which is the other one of the front and rear shafts, the driving force distributor being configured to variably change driving force distribution between the main drive shaft and the sub-drive shaft;
 a clutch provided on the sub-drive shaft to engage and disengage transmission of driving force to each of a left wheel and a right wheel, instead of a differential mechanism between the right and left wheels,
 a forward driving state estimator to estimate a forward driving state of a vehicle by recognizing a forward driving path of the vehicle;

a clutch controller to control the engagement and disengagement of the right and left clutches of the sub-drive shaft based on at least the forward driving state of the vehicle estimated by the forward driving state estimator; and a driving force distribution controller to calculate, as a target yaw moment, a yaw moment which is applied to the vehicle based on an operation state of the vehicle, and control the driving force distributor based on the target yaw moment, wherein, when an average speed of right and left wheels of the main drive shaft is not more than a speed of a turning outer wheel of the sub-drive shaft, the driving force distribution controller sets the driving force distribution for the sub-drive shaft to zero.

2. The control device for a four-wheel drive vehicle according to claim 1, wherein when there is a curve in the forward driving path recognized by the forward driving state estimator, the clutch controller engages the clutch for the turning outer wheel and disengages the clutch for a turning inner wheel during driving the curve.

3. The control device for a four-wheel drive vehicle according to claim 1, wherein when there is no curve in the forward driving path recognized by the forward driving state estimator, the clutch control unit engages right and left clutches when it is estimated that the vehicle receives a predetermined disturbance input during forward driving.

4. The control device for a four-wheel drive vehicle according to claim 2, wherein when there is no curve in the forward driving path recognized by the front driving state estimator, the clutch control unit engages right and left clutches when it is estimated that the vehicle receives a predetermined disturbance input during forward driving.

5. The control device for a four-wheel drive vehicle according to claim 1, wherein when the average speed of the right and left wheels of the main drive shaft is more than the speed of the turning outer wheel of the sub-drive shaft, the driving force distribution controller controls the driving force distributor based on the target yaw moment, and the clutch controller engages the clutch unit of the sub-drive shaft for the turning outer wheel.

6. The control device for a four-wheel drive vehicle according to claim 2, wherein when the average speed of the right and left wheels of the main drive shaft is more than the speed of the turning outer wheel of the sub-drive shaft, the driving force distribution controller controls the driving force distributor based on the target yaw moment, and the clutch controller engages the clutch unit of the sub-drive shaft for the turning outer wheel.

7. The control device for a four-wheel drive vehicle according to claim 1, wherein an amount of control set based on the target yaw moment to control the driving force distributor is set in accordance with either one of a transmission output torque and a target driving torque of the turning outer wheel of the sub-drive shaft, whichever is smaller.

8. The control device for a four-wheel drive vehicle according to claim 2, wherein an amount of control set based on the target yaw moment to control the driving force distributor is set in accordance with either one of a transmission output torque and a target driving torque of the turning outer wheel of the sub-drive shaft, whichever is smaller.

9. The control device for a four-wheel drive vehicle according to claim 1, wherein the target yaw moment is a yaw moment for suppressing understeer tendency of the vehicle.

10. The control device for a four-wheel drive vehicle according to claim 2, wherein the target yaw moment is a yaw moment for suppressing understeer tendency of the vehicle.

11. The control device for a four-wheel drive vehicle according to claim 1, wherein the clutch to engage and disengage transmission of the driving force is a wheel clutch.

12. The control device for a four-wheel drive vehicle according to claim 2, wherein the clutch to engage and disengage transmission of the driving force is a wheel clutch.

13. The control device for the four-wheel drive vehicle according to claim 1, wherein the main drive shaft is a front shaft of the vehicle, and the sub-drive shaft is a rear shaft of the vehicle.

14. The control device for the four-wheel drive vehicle according to claim 2, wherein the main drive shaft is a front shaft of the vehicle, and the sub-drive shaft is a rear shaft of the vehicle.

* * * * *